No. 856,143.  
PATENTED JUNE 4, 1907.  
J. H. HARDEN.  
RATCHET POWER.  
APPLICATION FILED AUG. 9, 1906.
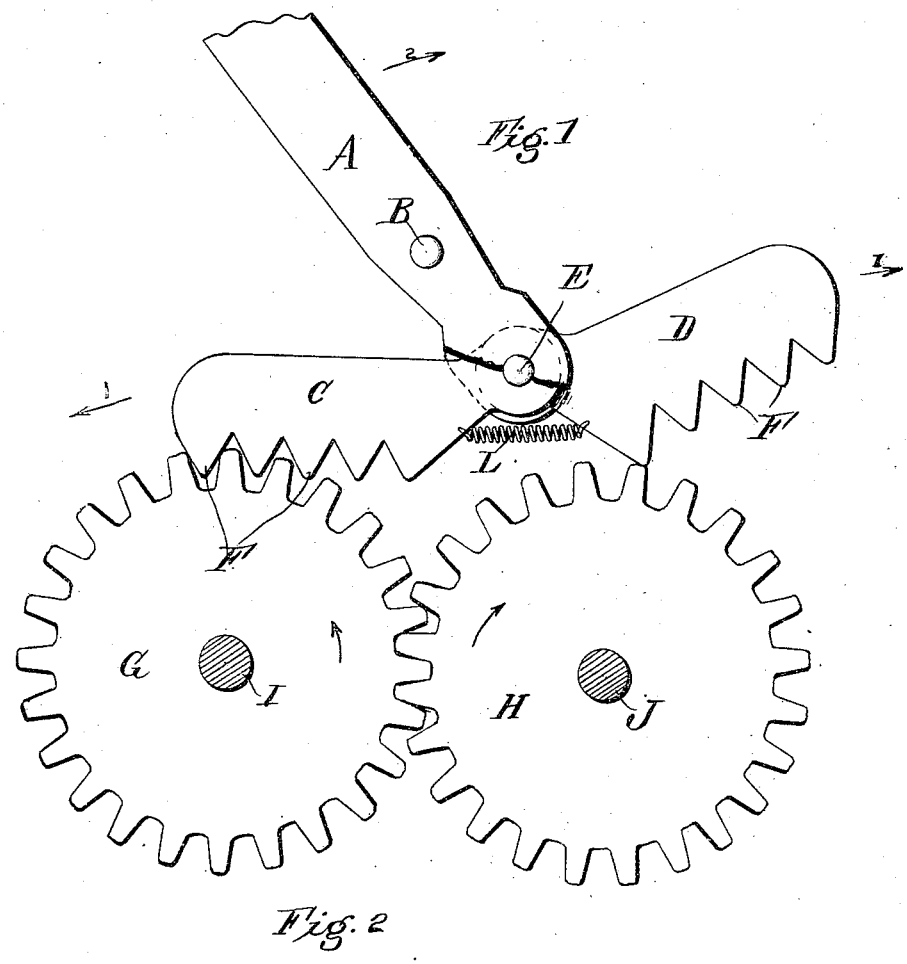
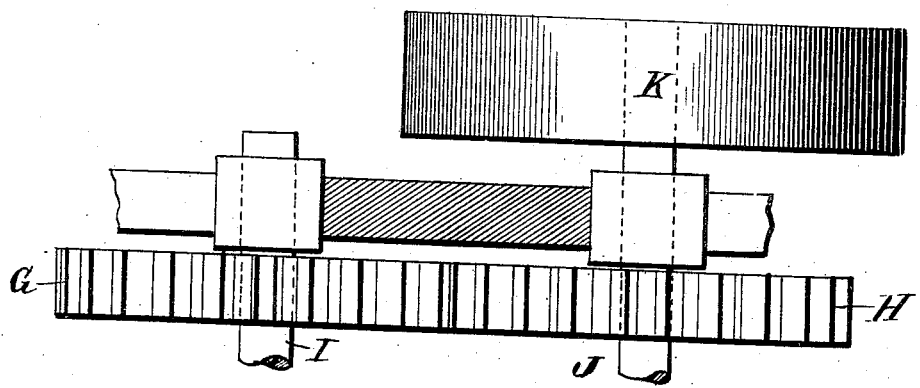
WITNESSES  
INVENTOR  
JAMES H. HARDEN  
BY  
ATTORNEYS

UNITED STATES PATENT OFFICE.

JAMES HENRY HARDEN, OF ANNISTON, ALABAMA.

RATCHET-POWER.

No. 856,143.  Specification of Letters Patent.  Patented June 4, 1907.

Application filed August 8, 1906. Serial No. 329,748.

*To all whom it may concern:*

Be it known that I, JAMES HENRY HARDEN, a citizen of the United States, and a resident of Anniston, in the county of Calhoun and State of Alabama, have invented a new and Improved Ratchet-Power, of which the following is a specification.

The invention relates to means, manual or mechanical, whereby to convert applied reciprocal motion into rotary motion, and has for its object, peculiar, novel and improved means for the purpose stated, involving rotatable shafts operatively connected by suitable gearing, and a novel form of ratchet power devices, all as will hereinafter be fully described.

The invention consists of the special construction, arrangement, and combination of parts, shown by the accompanying drawing, and hereinafter described in detail, the novelty thereof being pointed out in the appended claims.

In the drawing, Figure 1 is a diagrammatic view in illustration of my invention. Fig. 2 is a similar view, in illustration of one form of rotatable shafts geared together, and adapted for operating application thereto, of my improved ratchet power means.

In the practice of my invention I employ a lever A having suitable fulcrum support at B.

C, D, denote separate arms arranged projecting in opposite directions, from a common pivotal attachment E, to the lower end of the lever A. The under side or lower edge of the arms C, D, is provided with a series of suitable ratchet teeth F.

G, H, denote gear wheels arranged on rotatably supported shafts I, J, with their teeth disposed intermeshing, as shown.

It is designed to provide means on one or both the shafts I, J in nature substantially as a pulley K, whereby through suitable connection, to impart operative power to the driven machine or device.

It is intended that the arms be arranged to freely swing on their pivotal attachment E, to the lever A, and with their teeth F located in position, adapted for engagement with the teeth of the gear wheels G, H, as shown by Fig. 1.

The teeth F on the arms C, D, are yieldingly held into engagement with the teeth of the gear wheels G, H, through means of a spring L with its ends secured to the arms C, D, suitably below the point of pivotal attachment E, of the arms to the lever A.

I would add that the teeth F on the arms C, D, should be constructed for locking engagement with the teeth of the gear wheels, when the arms are forced forward in direction indicated by the arrows 1, and for slipping engagement when they are drawn reversely to the direction indicated by the arrows 1.

In Fig. 1 the teeth of the arm C are shown in locking engagement with the teeth of the gear wheel G, and teeth of the arm D in slipping engagement with the teeth of the gear wheel H.

Now obviously upon manual or mechanical application of power, to the upper end of the lever A, adjusting it in direction indicated by the arrow 2, the arm C will be moved forward, and through its operative engagement with the gear wheel G, will impart rotary motion thereto; the wheels G, H, being in gear as shown and described, it is apparent that motion thus set up in one wheel will transmit similar, but reverse motion to the other wheel, and it is further apparent that reverse reciprocation or oscillation of the lever A, will operate through locking engagement of the toothed arm D, continuing rotation of the gear wheel, the shafts I, J, and the pulley K, from which latter power is conveyed to the driven machine or device.

I claim:

A ratchet power comprising a fulcrumed lever, oppositely projecting arms having pivotal attachment to the lower or short end of the lever, there being a series of ratchet teeth on each of the pivoted arms, a spring extending from one to the other of said arms, the spring being connected and operating to turn the arms on their pivotal support, intermeshing gear wheels on rotatable shafts, one of said arms being arranged with its teeth adapted to engage the teeth of one gear wheel, and the oppositely projecting arm being arranged with its teeth to engage the teeth of the other gear wheel, the arms being held in contact with the gear wheels by tension of said spring.

JAMES HENRY HARDEN.

Witnesses:
 ALEXANDER GREET,
 E. W. LEDBETTER.